(12) United States Patent
Han et al.

(10) Patent No.: US 8,011,804 B2
(45) Date of Patent: Sep. 6, 2011

(54) BACKLIGHT UNIT (75) Inventors: Sang Ho Han, Gyeongsangbuk-do (KR);
Do Yune Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/295,515

(22) Filed: Dec. 7, 2005

(65) Prior Publication Data

US 2007/0002565 A1    Jan. 4, 2007

(30) Foreign Application Priority Data

Jun. 30, 1920   (KR) .................. 10-2005-0058215

(51) Int. Cl.
*F21S 4/00* (2006.01)
*F21V 21/00* (2006.01)
*F21V 7/00* (2006.01)
*F21V 1/00* (2006.01)
*F21V 13/00* (2006.01)
*G09F 13/04* (2006.01)

(52) U.S. Cl. .................. 362/249.02; 362/247; 362/97.1; 362/97.3; 362/241; 362/243; 362/217.05; 362/346

(58) Field of Classification Search .................. 362/294, 362/249, 97.1, 97.3, 241, 249.02, 346, 243, 362/217.05
See application file for complete search history.

(56) References Cited

U.S. PATENT DOCUMENTS

| | | | | | |
|---|---|---|---|---|---|
| 4,872,098 | A | * | 10/1989 | Romano | 362/283 |
| 5,580,156 | A | * | 12/1996 | Suzuki et al. | 362/184 |
| 6,491,411 | B2 | * | 12/2002 | Itoh | 362/246 |
| 6,547,416 | B2 | * | 4/2003 | Pashley et al. | 362/231 |
| 6,644,841 | B2 | * | 11/2003 | Martineau | 362/545 |
| 6,793,361 | B2 | * | 9/2004 | Matsui | 362/97.1 |
| 6,851,835 | B2 | * | 2/2005 | Smith et al. | 362/305 |
| 6,913,378 | B2 | * | 7/2005 | Ho | 362/560 |
| 6,964,489 | B2 | * | 11/2005 | Blume et al. | 362/27 |
| 7,008,079 | B2 | * | 3/2006 | Smith | 362/235 |
| 7,097,337 | B2 | * | 8/2006 | Kim et al. | 362/555 |
| 7,163,315 | B2 | * | 1/2007 | Chang et al. | 362/245 |
| 7,186,010 | B2 | * | 3/2007 | Coushaine et al. | 362/547 |
| 7,255,462 | B2 | * | 8/2007 | Tseng | 362/330 |
| 2002/0039292 | A1 | * | 4/2002 | Matsui | 362/297 |
| 2003/0235050 | A1 | * | 12/2003 | West et al. | 362/327 |
| 2004/0183962 | A1 | * | 9/2004 | Hua-Nan et al. | 349/64 |
| 2004/0218388 | A1 | * | 11/2004 | Suzuki | 362/231 |
| 2005/0276066 | A1 | * | 12/2005 | Kim et al. | 362/561 |
| 2006/0013000 | A1 | * | 1/2006 | Coushaine et al. | 362/294 |
| 2006/0215075 | A1 | * | 9/2006 | Huang et al. | 349/67 |
| 2006/0245208 | A1 | * | 11/2006 | Sakamoto et al. | 362/612 |

FOREIGN PATENT DOCUMENTS

JP    4-55086    5/1992

(Continued)

*Primary Examiner* — Hargobind S Sawhney
*Assistant Examiner* — David J Makiya
(74) *Attorney, Agent, or Firm* — Morgan, Lewis & Bockius LLP (57) ABSTRACT

A backlight unit includes a bottom cover having a bottom surface and side surfaces, a plurality of light emitting diodes installed within the bottom cover for emitting a plurality of lights, a reflection plate within the bottom cover, the reflection plate having a variety of angles for mixing the plurality of lights into a white light, and a diffusion plate attached to the bottom cover for diffusing the white light.

4 Claims, 5 Drawing Sheets

FOREIGN PATENT DOCUMENTS

| | | |
|---|---|---|
| JP | 4-188680 | 7/1992 |
| JP | 7-231116 | 8/1995 |
| JP | 11-260122 | 9/1999 |
| JP | 2004 516666 | 6/2004 |
| JP | 2004 319458 | 11/2004 |
| WO | WO 02/50472 A1 | 6/2002 |

* cited by examiner

BACKLIGHT UNIT

This application claims the benefit of the Korean Patent Application No. P2005-058215 filed on Jun. 30, 2005, which is hereby incorporated by reference in its entirety.

BACKGROUND OF THE INVENTION

1. Field of the Invention

The present invention relates to a light unit, and more particularly to a backlight unit. Although the present invention is suitable for a wide scope of applications, it is particularly suitable for improving brightness uniformity and simplifying the fabrication process of a backlight unit.

2. Description of the Related Art

In generally, there is a trend in which the range of applications for a liquid crystal display device is broadening due to its characteristics of light weight, thin profile, and low driving power consumption. In keeping with this trend, the liquid crystal display device is now being used in office automation equipment and home audio/video equipment. The liquid crystal display device controls the transmitted amount of a light beam in accordance with a video signal applied to a plurality of control switches which are arranged in a matrix shape, thereby displaying a desired picture on a screen. Thus, the liquid crystal display device requires a separate light source, such as a backlight, because the liquid crystal display device in and of itself is not a self-luminous display device.

There are two types of backlight for a liquid crystal display device depending on where the light source is located on the liquid crystal display device. The first type is a direct type and the second type is the edge type. The edge type backlight has a light source installed at an edge of one side of a liquid crystal display device, and irradiates light from the light source to a liquid crystal display panel through a light guide panel and a plurality of optical sheets. The direct type backlight has a plurality of light sources disposed directly under the liquid crystal display device, and irradiates the light from the light sources to the liquid crystal display panel through a diffusion plate and a plurality of optical sheets. A cold cathode fluorescent lamp (CCFL) and a light emitting diode (LED) are typically used as a light source in a backlight. The direct type backlight, which has higher brightness, light uniformity and color purity than the edge type backlight, is mostly used in an LCD TV.

Figure 1:
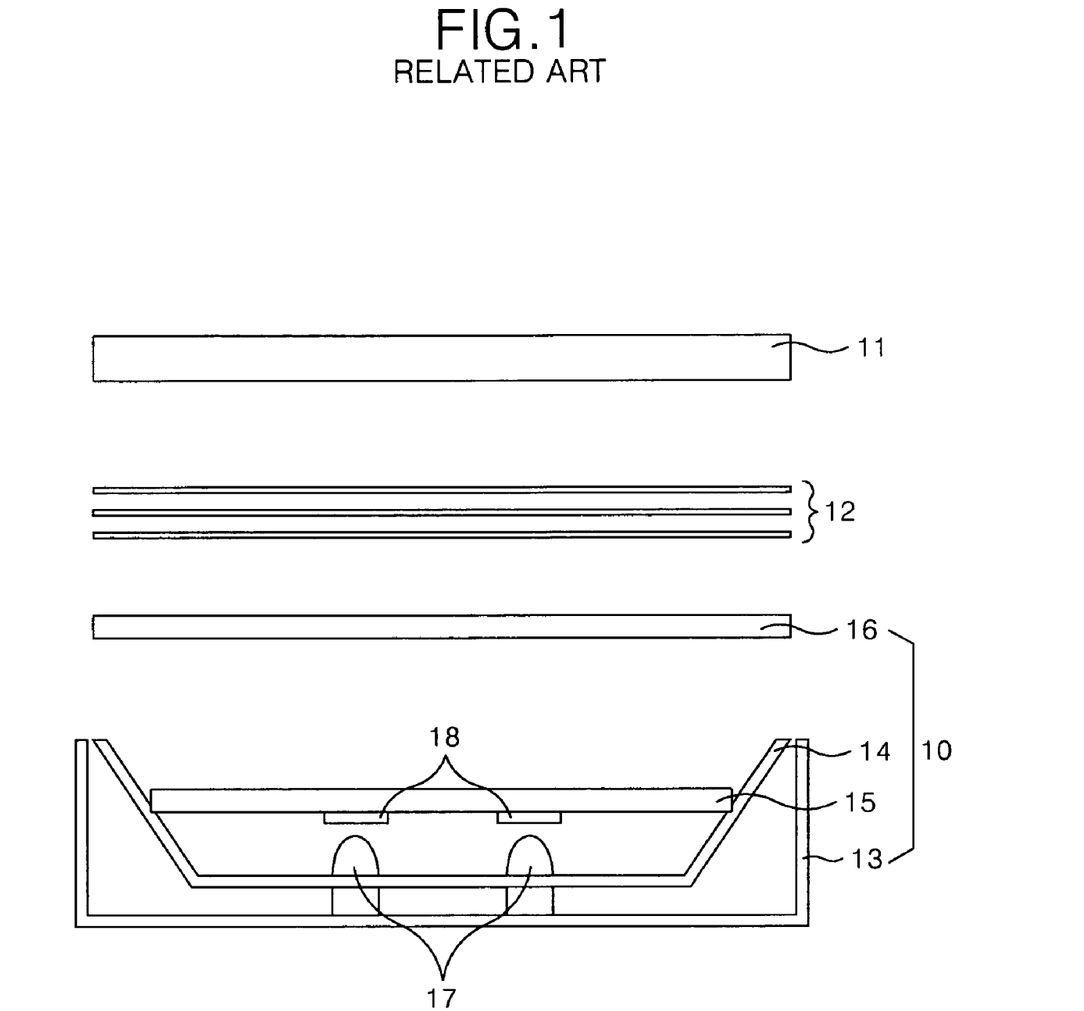
FIG. 1 is a cross-sectional diagram representing a liquid crystal display module of the related art.

FIG. 1 is a cross-sectional diagram representing a liquid crystal display module of the related art. As shown in FIG. 1, a related art liquid crystal display device includes a liquid crystal display panel 11 for displaying a picture; and a backlight unit 10 for irradiating light onto the liquid crystal display panel 11. A plurality of data lines and a plurality of scan lines are arranged to cross each other in the liquid crystal display panel 11 to define liquid crystal cells arranged in an active matrix shape between upper and lower substrates. Further, pixel electrodes are formed on the lower substrate and a common electrode is formed on the upper substrate such that an electric field can be applied across each of the liquid crystal cells. Thin film transistors (TFTs) are formed adjacent to where the data lines and gate lines cross. The TFTs apply a data signal to a pixel electrode in response to a scan signal on a gate line connected to the TFT. Gate drive IC's and data drive IC's are electrically connected through a tape carrier package (TCP) to the gate and data lines of the lower substrate.

The backlight unit 10 includes a bottom cover 13, a lower reflection plate 14, an intermediate light guide panel 15, a diffusion plate 16, a plurality of light emitting diodes 17 and a plurality of optical sheets 12. The bottom cover 13 includes a bottom surface and side surfaces. The lower reflection plate 14 is within the side surfaces of the bottom cover 13. The lower reflection plate 14 has holes in which the light emitting diodes 17 pass through.

The light emitting diodes 17 include a red light emitting diode, a green light emitting diode and a blue light emitting diode, and emit light in response to a current supplied from a light source drive circuit (not shown) so as to generate red, green and blue lights. The intermediate light guide panel 15 is formed of a transparent plastic material and disposed between the light emitting diodes 17 and the diffusion plate 16. Intermediate reflection plates 18 corresponding to the light emitting diodes are on a bottom surface of the intermediate light guide panel 15, which corresponds to a location on the intermediate light guide panel 15. The intermediate reflection plates 18 are diverters that reflects the lights of red, green and blue which are directly irradiated from the light emitting diodes 17.

The red, green and blue lights, which radiate from the light emitting diodes 17 by way of the lower reflection plate 14, the intermediate reflection plate 18 and the light guide panel 15 are mixed, and as a result, a white light is incident onto the optical sheets 12 through the intermediate light guide panel 15 and the diffusion plate 16. The intermediate light guide panel 15 is assembled to the bottom cover 13 along with the diffusion plate 16. The diffusion plate 16 includes a plurality of beads that disperse the light from the intermediate light guide panel 15. The beads disperse the light such that there is no difference in light distribution across the diffusion plate 16 between locations over the light emitting diodes and elsewhere in the display surface of the liquid crystal display panel 11. The optical sheets 12 include a diffusion sheet and a prism sheet for uniformly irradiating the light from the diffusion plate 16 across the whole surface of the liquid crystal display panel and to reorient the path of the light from the diffusion plate 16 into a perpendicular direction with respect to the display surface so as to increase brightness directly at the front of the display surface.

Such a backlight unit 10 has problems. In larger sizes of this type of liquid crystal display device, the intermediate light guide panel 15 can sag because supporting points for the intermediate light guide panel 15 only exist at the edges. Thus, a gap between the intermediate reflection plates 18 and the light emitting diodes 17 can vary in that the gap is smaller in the center of the liquid crystal display device. As a result, the amount of light incident onto the liquid crystal display panel 11 is reduced and brightness varies because the red, green and blue lights generated by the light emitting diodes 17 are not uniformly mixed. Accordingly, the purity degree of the white light, which is irradiated onto the liquid crystal display panel 11, decreases such that color reproduction characteristic of the liquid crystal display panel 11 can be degraded. Further, a process of adhering the reflector 18 to the intermediate light guide panel 15 is hard to be automated. More specifically, the reflector 18 is attached manually for each LED light source, thereby increasing production cost.

SUMMARY OF THE INVENTION

Accordingly, the present invention is directed to a backlight unit that substantially obviates one or more of the problems due to limitations and disadvantages of the related art.

An object of the present invention to provide a backlight unit without an intermediate light guide panel.

An object of the present invention to provide a backlight unit that can be simply manufactured.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a backlight unit includes a bottom cover having a bottom surface and side surfaces, a plurality of light emitting diodes installed within the bottom cover for emitting a plurality of lights, a reflection plate within the bottom cover, the reflection plate having a variety of angles for mixing the plurality of lights into white light, and a diffusion plate attached to the bottom cover for diffusing the white light.

In another aspect, a backlight unit includes a bottom cover having a bottom surface and side surfaces, a reflection plate within the bottom cover, a plurality of side-emitting light emitting diodes installed within holes in the reflection plate for emitting a plurality of lights, and a diffusion plate attached to the bottom cover such that there is a space directly in between the plurality of side-emitting light emitting diodes and the diffusion plate.

In yet another aspect, a backlight unit includes a bottom cover having a bottom surface and side surfaces, a plurality of light emitting diodes installed within the bottom cover for emitting a plurality of lights, a reflection plate within the bottom cover, the reflection plate having a variety of angles for mixing the plurality of lights into white light; and a diffusion plate attached to the bottom cover such that there is a space directly in between the plurality of light emitting diodes and the diffusion plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Embodiments of the present invention will be explained with reference to FIGS. 2 to 5.

Figure 2:
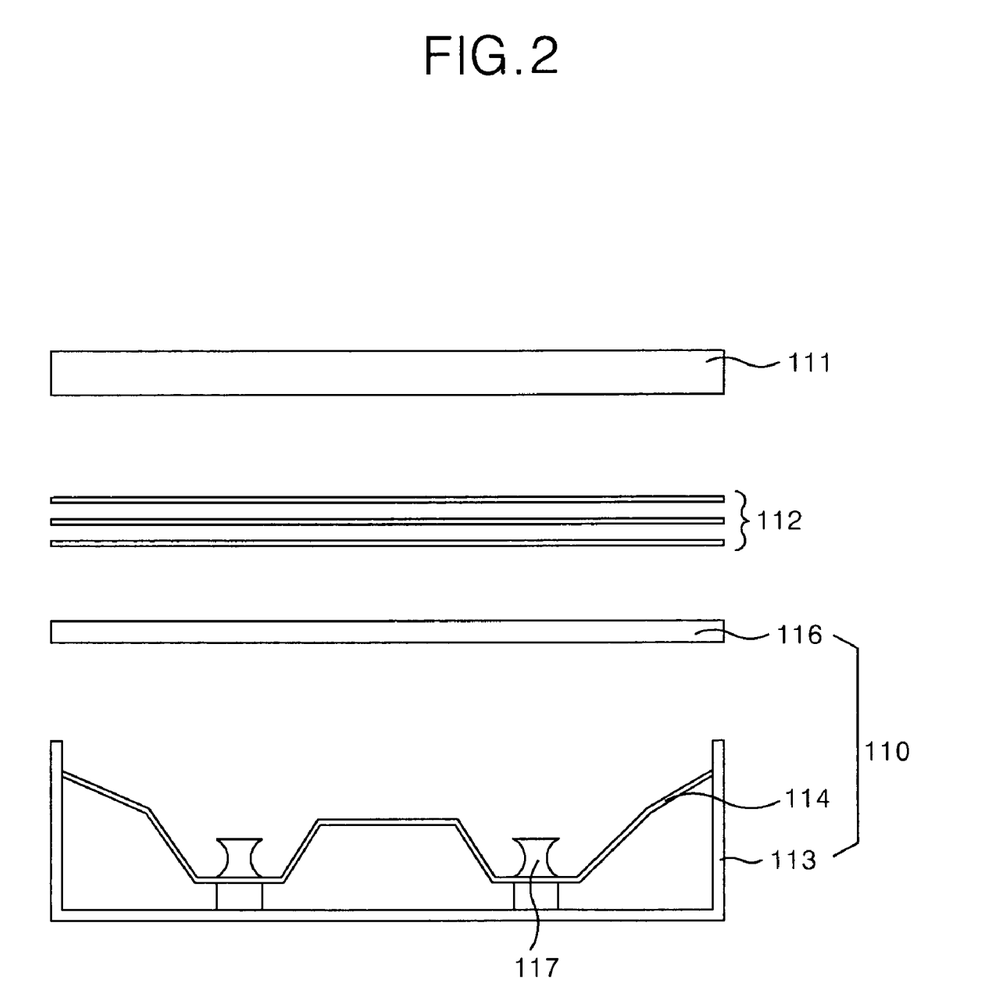
FIG. 2 is a cross-sectional diagram representing a liquid crystal display module according to an embodiment of the present invention.

FIG. 2 is a cross-sectional diagram representing a liquid crystal display module according to an embodiment of the present invention. As shown in FIG. 2, a liquid crystal display device according to an embodiment of the present invention includes a liquid crystal display panel 111 for displaying a picture and a backlight unit 110 for irradiating light to the liquid crystal display panel 111. A plurality of data lines and a plurality of gate lines are arranged to cross each other in the liquid crystal display panel 111 to define liquid crystal cells arranged in an active matrix shape between upper and lower substrates. Further, pixel electrodes are formed on the lower substrate and a common electrode is formed on the upper substrate such that an electric field can be applied across each of the liquid crystal cells. Thin film transistors (TFTs) are formed adjacent to where the data lines and gate lines cross. The TFTs apply a data signal to a pixel electrode in response to a scan signal on a gate line connected to the TFT. Gate drive IC's and data drive IC's are electrically connected through a tape carrier package (TCP) to the gate and data lines of the lower substrate.

A diffusion plate 116 is assembled to the bottom cover 113. The diffusion plate 116 includes a plurality of beads that disperse light from light emitting diodes (LEDs) 117 and a reflector 114. The beads disperse the light such that there is no difference in light distribution across the diffusion plate 116 between locations over LEDs and elsewhere in the backlight unit 110. Further, the diffusion plate 116 is attached to the bottom cover 113 such that there is a space directly in between the plurality of side-emitting light emitting diodes and the diffusion plate 116. A plurality of optical sheets 112 are located between the diffusion plate 116 and the backlight unit 110.

The backlight unit 110 includes a bottom cover 113, a plurality of side-emitting light emitting diodes 117 and a plurality of reflection plates 114. The bottom cover 113 includes a bottom surface and side surfaces. The lower reflection plate 114 is within the side surfaces of the bottom cover. The lower reflection plate 114 has holes in which the side-emitting light emitting diodes 117 pass through.

The side-emitting light emitting diodes 117 include a red light emitting diode, a green light emitting diode and a blue light emitting diode. The side-emitting light emitting diodes emit light in response to a current supplied from a light source drive circuit. Unlike the light emitting diodes 17 of the related art, the side-emitting light emitting diodes 117 in embodiments of the present invention only emits light to the sides. In other words, the side-emitting light emitting diodes 117 in embodiments of the present invention does not emit light directly toward the diffusion plate 116. The reflection plate 114 mixes the red, green and blue lights generated from the side-emitting light emitting diodes 117 into a white light by reflecting the lights from the side-emitting light emitting diodes 117 at a variety of angles.

Figure 3:
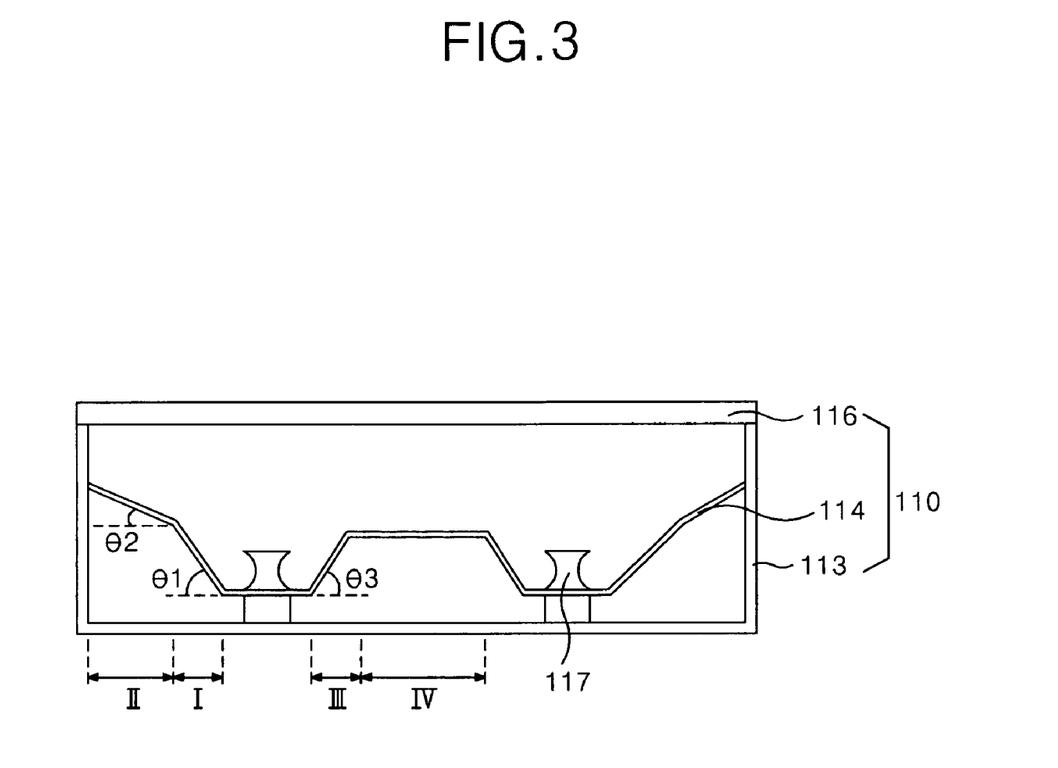
FIG. 3 is a cross-sectional diagram representing a backlight unit according to an embodiment of the present invention.

FIG. 3 is a cross-sectional diagram representing a backlight unit according to an embodiment of the present invention. As shown in FIG. 3, the reflection plate 114 located within the backlight unit 110 includes a first portion I, which extends from one of the side-emitting light emitting diodes 117 toward an adjacent side surface of the bottom cover 113. The first portion I is inclined at a first reflection angle $\theta 1$ with respect to the bottom surface of the bottom cover 113. The reflection plate 114 also includes a second portion II, which extends from the first portion I toward an adjacent side surface of the bottom cover 113. The second portion II is inclined at a second reflection angle $\theta 2$ with respect to the bottom surface of the bottom cover 113. Further, the reflection plate 114 includes a third portion III, which extends from one of the side-emitting light emitting diodes 117 toward another one of the side-emitting light emitting diodes 117. The third portion III is inclined at a third reflection angle θ3 with respect to the bottom surface of the bottom cover 113. Furthermore, the reflection plate 114 includes a fourth portion IV, which is parallel to the bottom surface of bottom cover 113, that extends between two adjacent third portions III.

The first reflection angle θ1 is between about 0°~90°. The second reflection angle θ2 is between about 5°~90°. The first reflection angle θ1 can be equal to the second reflection angle θ2 such that the reflection plate 114 through portions I and II can be a straight line. The third reflection angle θ3 is between about 5°~90°. As shown in FIG. 3, the third reflection angle θ3 can be greater than the first reflection angle θ1 while the first reflection angle θ1 is greater than the second reflection angle θ2.

The reflection angles of θ1 to θ3 are set depending on a distance D between the diffusion plate 116 and the side-emitting light emitting diodes 117. This is because the light generated in the side-emitting light emitting diode 117 is reflected by the reflection plate and is mixed into the white light in the space encompassed by the side-emitting light emitting diode 117, the diffusion plate 116 and the reflection plate 114. There is a distance D at which the light generated in the side-emitting light emitting diode 117 is reflected by the reflection plate 114 and mixed to form uniform white light when the reflection angles of θ1 to θ3 for the reflection plate 114 are small.

Figure 4:
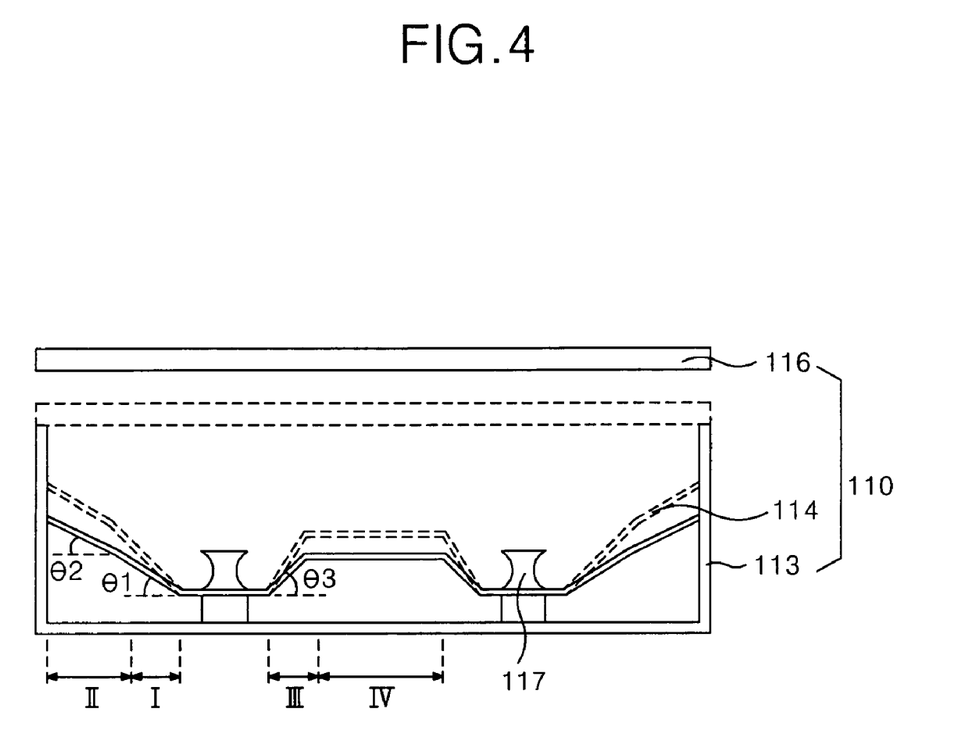
FIG. 4 is a cross-sectional diagram representing a backlight unit according to another embodiment of the present invention.
Figure 5:
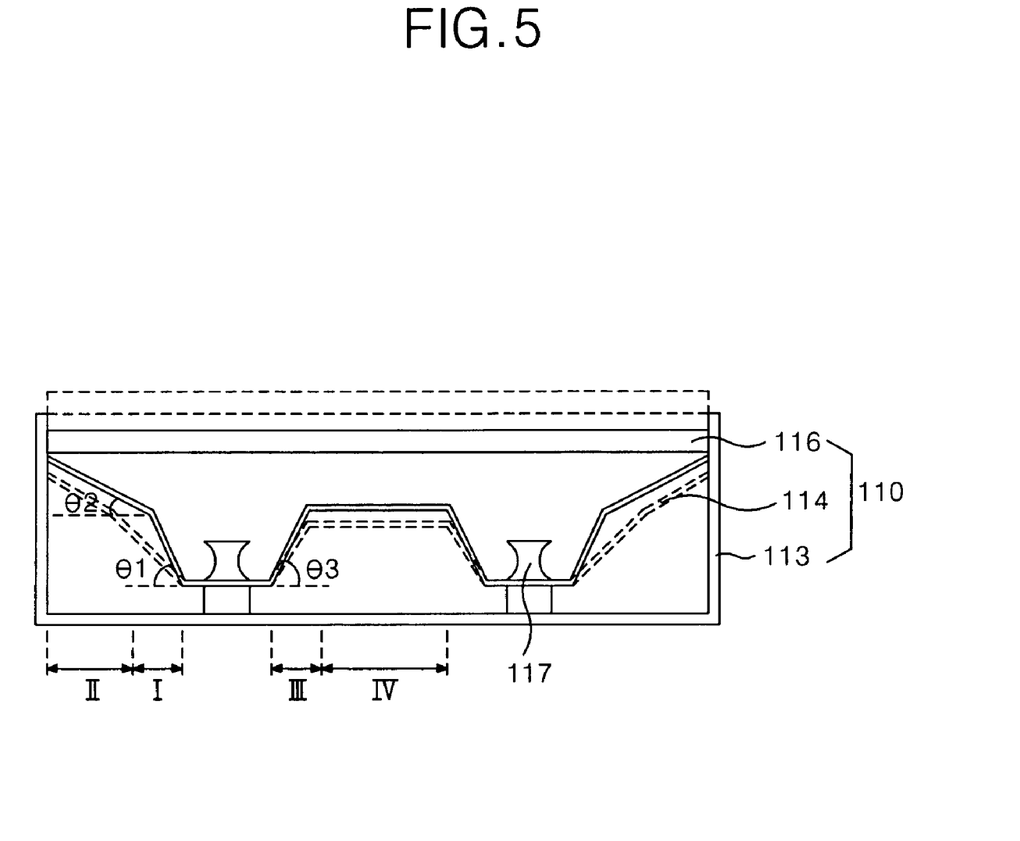
FIG. 5 is a cross-sectional diagram representing a backlight unit according to still another embodiment of the present invention.

FIG. 4 is a cross-sectional diagram representing a backlight unit according to another embodiment of the present invention. As shown in FIG. 4, a distance D for uniform white light is larger when the reflection angles of θ1 to θ3 are smaller. In general, as the reflection angles of θ1 and θ3 become smaller, a distance D between the diffusion plate 116 and the side-emitting light emitting diodes 117 is larger, as shown in FIG. 4. FIG. 5 is a cross-sectional diagram representing a backlight unit according to still another embodiment of the present invention. As shown in FIG. 5, when the reflection angles of θ1 and θ3 become larger, a distance D between the diffusion plate 116 and the side-emitting light emitting diode 117 decreases.

Because the reflector 114 reflects the lights from the side-emitting light emitting diodes 117 to mix into a uniform white light, the intermediate light guide panel can be omitted so as to permanently alleviate the problem of sagging in an intermediate light guide panel. Further, it is possible to uniformly mix the lights emitted from the side-emitting light emitting diodes without the intermediate light guide panel with reflectors thereon by using the reflection plate having a variety of angles. Furthermore, the fabrication of the backlight unit is simplified since the process of individually bonding reflectors to the intermediate light guide panel is also omitted. The reflection plate can be formed of any existing light reflective material, such as aluminum Al, which has high thermal conductivity and efficiently reflects light.

As described above, among other things, the backlight unit according to embodiments of the present invention eliminates the intermediate light guide panel, thereby eliminating the problems caused when the intermediate light guide panel sags and simplifying the manufacturing process.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:

a bottom cover having a bottom surface and side surfaces;

light emitting diodes installed within the bottom cover and extending to a first height from the bottom surface of the bottom cover for emitting a plurality of lights, wherein the light emitting diodes include side-emitting light emitting diodes emitting red, green and blue lights;

a reflection plate within the bottom cover, the reflection plate having at least three reflection surfaces at a variety of angles for mixing the red, green and blue lights into a white light; and a diffusion plate attached to the bottom cover for diffusing the white light such that there is a space directly in between the plurality of light emitting diodes and the diffusion plate, wherein the reflection plate includes:

a first reflection surface between one of the light emitting diodes and one of the side surfaces of the bottom cover, the first reflection surface being inclined at a first reflection angle with respect to the bottom surface of the bottom cover;

a second reflection surface between the first reflection surface and one of the side surfaces of the bottom cover, the second reflection surface being inclined at a second reflection angle with respect to the bottom surface of the bottom cover;

a third reflection surface between the light emitting diodes, the third reflection surface being inclined at a third reflection angle with respect to the bottom surface of the bottom cover, and a fourth reflection surface between each one of the light emitting diodes, wherein the fourth reflection surface parallel to the bottom surface of bottom cover and extends between two adjacent third reflection surfaces, wherein heights of the second and the fourth entire reflection surfaces are each greater than the first height, wherein the first angle of the first reflection surface is greater than the second angle of the second reflection surface and wherein the third angle of the third reflection surface is greater than the first angle of the first reflection surface, wherein the first reflection surface opposites to the third reflection surface, wherein a height of the lowest position at the first reflection surface is the same as a height of the lowest position at the third reflection surface, wherein the highest position at the first reflection surface is higher than the highest position at the third reflection surface, wherein the first to third angles of the first to third reflection surfaces are set depending on a distance between the diffusion plate and the light emitting diodes, wherein a length of the fourth reflection surface is longer than a length of the third reflection surface, wherein each of the side-emitting light emitting diodes emits the light to only the reflection plate, positioned at sides of the side-emitting light emitting diode, and does not emit the light directly toward the diffusion plate, wherein the side-emitting light emitting diode has concave portions, opposite to the reflection plate, at the sides of the side-emitting light emitting diode, and wherein when the first and third reflection angles become smaller, a distance between the diffusion plate and the side-emitting light emitting diode is larger and when the first and third reflection angles become larger, the distance is smaller.

2. The backlight unit according to claim 1, wherein the first reflection angle is about 5°-90° and the second reflection angle is about 0°-90°.

3. The backlight unit according to claim 1, wherein the third reflection angle is about 5°-90°.

4. The backlight unit according to claim 1, wherein the reflection plate is formed of aluminum.

* * * * *